(12) United States Patent
Sato et al.

(10) Patent No.: US 11,165,880 B2
(45) Date of Patent: Nov. 2, 2021

(54) SERVER DEVICE, CONTENT TRANSMITTING METHOD, AND DOWNLOAD MANAGING METHOD

(71) Applicant: Sony Interactive Entertainment Inc., Tokyo (JP)

(72) Inventors: Takuya Sato, Chiba (JP); Hisanori Ogasawara, San Diego, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/895,526

(22) Filed: Jun. 8, 2020

(65) Prior Publication Data
US 2020/0404071 A1 Dec. 24, 2020

(30) Foreign Application Priority Data
Jun. 20, 2019 (JP) .............................. JP2019-114593

(51) Int. Cl.
*G06F 15/16* (2006.01)
*H04L 29/08* (2006.01)

(52) U.S. Cl.
CPC .................... *H04L 67/30* (2013.01)

(58) Field of Classification Search
CPC ............................. H04L 67/30; H04L 67/32
See application file for complete search history.

(56) References Cited

U.S. PATENT DOCUMENTS

2015/0288692 A1* 10/2015 Wei .................... H04L 67/20
726/29
2020/0242576 A1* 7/2020 Segal ..................... G06Q 30/02

FOREIGN PATENT DOCUMENTS

| JP | 2008-513184 A | 5/2008 |
|---|---|---|
| JP | 2013-037395 A | 2/2013 |
| JP | 2016-091122 A | 5/2016 |
| JP | 2016-522913 A | 8/2016 |
| WO | 2006/034482 A2 | 6/2006 |
| WO | 2006/034482 A3 | 6/2006 |
| WO | 2014/164109 A2 | 10/2014 |
| WO | 2014/164109 A3 | 10/2014 |

OTHER PUBLICATIONS

Japanese Office Action dated Mar. 9, 2021, for the Corresponding Japanese Patent Application No. 2019-114593.

* cited by examiner

*Primary Examiner* — Ryan J Jakovac
(74) *Attorney, Agent, or Firm* — Katten Muchin Rosenman LLP

(57) ABSTRACT

A server device includes: a request receiving section configured to receive a request to obtain a content from a user; a request retaining section configured to retain the request to obtain the content in association with an account of the user; a sign-in managing section configured to permit the user to sign in from a terminal device by using the account of the user; and a transmission control section configured to give an instruction to transmit the content requested to be obtained to the terminal device. The transmission control section decides to transmit the content to the terminal device in a case where the signed-in user satisfies a predetermined condition in relation to the terminal device.

7 Claims, 9 Drawing Sheets

| ACCOUNT | CONTENT | DOWNLOAD DEVICE | STATE |
|---|---|---|---|
| ACCOUNT OF USER A | ABC Tennis2019 | | BEFORE DL |

| ACCOUNT | CONTENT | DOWNLOAD DEVICE | STATE |
|---|---|---|---|
| ACCOUNT OF USER A | ABC Tennis2019 | APPARATUS ID OF GAME DEVICE 7 | DL CONFIRMED |

26

9b

| ACCOUNT | CONTENT | DOWNLOAD DEVICE | STATE |
|---|---|---|---|
| ACCOUNT OF USER A | ABC Tennis2019 | APPARATUS ID OF GAME DEVICE 7 | DL COMPLETED |

26

| ACCOUNT | CONTENT | DOWNLOAD DEVICE | STATE |
|---|---|---|---|
| ACCOUNT OF USER A | ABC Tennis2019 | APPARATUS ID OF GAME DEVICE 7 | DL CONFIRMED |

26

SERVER DEVICE, CONTENT TRANSMITTING METHOD, AND DOWNLOAD MANAGING METHOD

CROSS REFERENCE TO RELATED APPLICATION

This application claims the benefit of Japanese Priority Patent Application JP 2019-114593 filed Jun. 20, 2019, the entire contents of which are incorporated herein by reference.

BACKGROUND

The present disclosure relates to a technology of transmitting a content to a terminal device.

Japanese Patent Laid-Open No. 2016-91122 discloses an information processing system in which when a user transmits a download request from a second information processing device to an external server, a first information processing device downloads a content from the external server. This mechanism is referred to as a "remote download," which enables the user to purchase the content from a portable terminal device such as a smart phone at a place away from home, and download the content to a game device at the home.

SUMMARY

When a purchased new game device arrives at the home, the user connects the game device to a television set, and thereafter makes initial settings such as selection of a language to be used, setting of Internet connection, setting of a date and time, and a power saving setting. After of completion of the initial settings, when the user possesses a game disk, the user can start game play immediately by inserting the game disk into the game device. When the user does not possess the game disk, the user signs in to a content server, purchases a game, and downloads the purchased game to the game device to play the game. It is anticipated that at this time, the user is not accustomed to operation of the new game device, and thus takes a time to start game play. It is therefore desirable to construct a mechanism that can shorten a time taken from completion of the initial settings to a start of game play.

It is desirable to realize a mechanism that enables a user to execute a content such as a game immediately on a terminal device such as a newly purchased game device.

In order to solve the above problems, according to a mode of the present disclosure, there is provided a server device including: a request receiving section configured to receive a request to obtain a content from a user; a request retaining section configured to retain the request to obtain the content in association with an account of the user; a sign-in managing section configured to permit the user to sign in from a terminal device by using the account of the user; and a transmission control section configured to give an instruction to transmit the content requested to be obtained to the terminal device. The transmission control section decides to transmit the content to the terminal device in a case where the signed-in user satisfies a predetermined condition in relation to the terminal device.

According to another mode of the present disclosure, there is provided a server device including: a request receiving section configured to receive a request to obtain a content from a user; a request retaining section configured to retain the request to obtain the content in association with an account of the user; a sign-in managing section configured to permit the user to sign in from a terminal device in which the content requested to be obtained is installed by using the account; and a state managing section configured to determine that processing for the obtainment request is completed in a case where the signed-in user satisfies a predetermined condition in relation to the terminal device.

According to further another mode of the present disclosure, there is provided a content transmitting method including: receiving a request to obtain a content from a user; retaining the request to obtain the content in association with an account of the user; permitting the user to sign in from a terminal device by using the account of the user; and giving an instruction to transmit the content requested to be obtained to the terminal device in a case where the signed-in user satisfies a predetermined condition in relation to the terminal device.

According to yet another mode of the present disclosure, there is provided a download managing method including: receiving a request to obtain a content from a user; retaining the request to obtain the content in association with an account of the user; permitting the user to sign in from a terminal device in which the content requested to be obtained is installed by using the account; and determining that processing for the obtainment request is completed in a case where the signed-in user satisfies a predetermined condition in relation to the terminal device.

Any combinations of the above constituent elements and modes obtained by converting expressions of the present disclosure between a method, a device, a system, a recording medium, a computer program, and the like are also effective as modes of the present disclosure.

According to the present disclosure, it is possible to realize a mechanism that enables a user to execute a content such as a game immediately on a terminal device such as a newly purchased game device.

BRIEF DESCRIPTION OF THE DRAWINGS

FIG. 6 is a diagram depicting a state related to download in the obtainment request;

DETAILED DESCRIPTION OF THE PREFERRED EMBODIMENT

Figure 1:
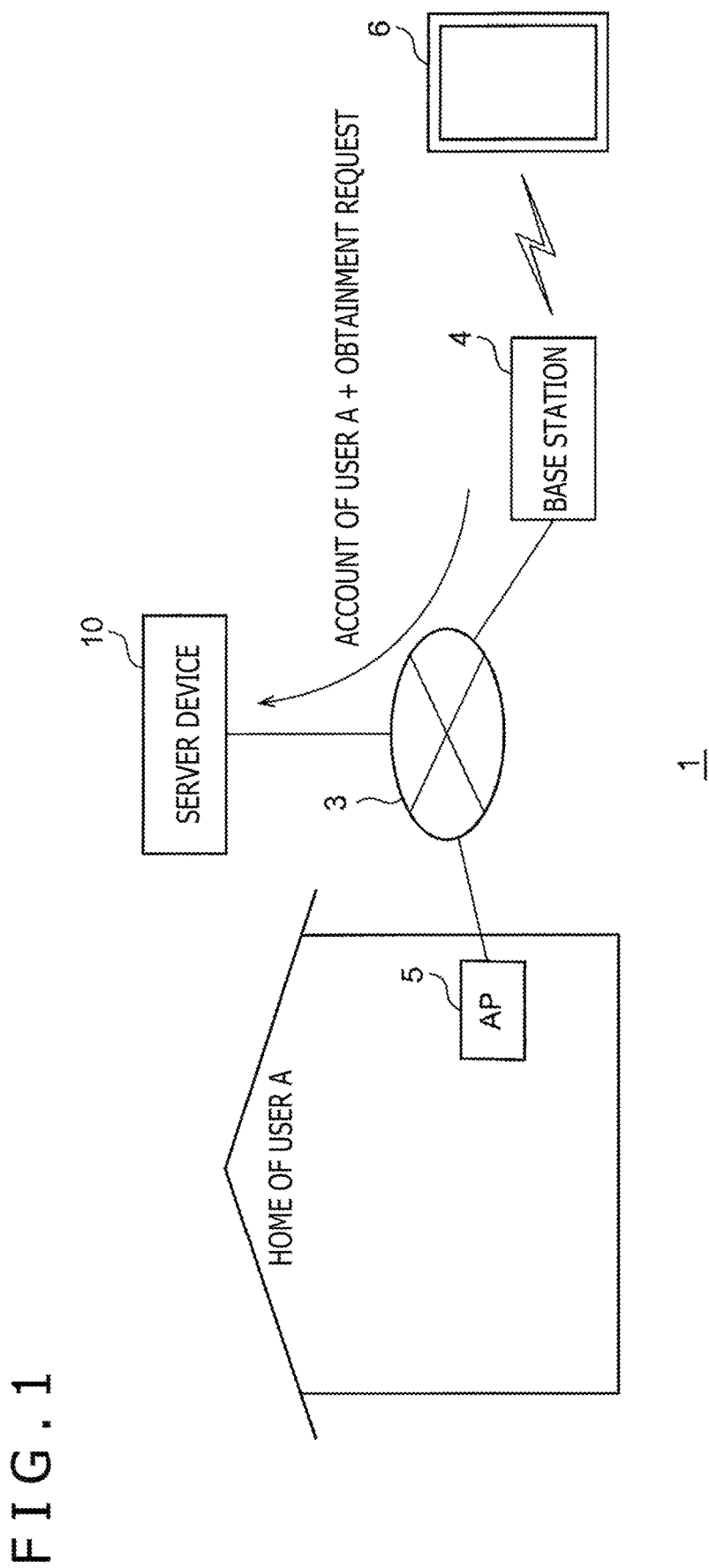
FIG. 1 is a diagram depicting an information processing system according to an embodiment.

FIG. 1 depicts an information processing system 1 according to an embodiment of the present disclosure. A portable terminal device 6 is a smart phone or a tablet device possessed by a user A. The user A can carry the portable terminal device 6, and operate the portable terminal device 6 at any time. The portable terminal device 6 is communicatably connected to a server device 10 via a base station 4 and a network 3.

The server device 10 provides various kinds of services to users of the information processing system 1. The server device 10 may be physically formed by a plurality of servers, and the servers may be maintained and managed by entities corresponding to respective functions. The user A can be provided with the various kinds of services by the server device 10 after signing in to the server device 10 using the portable terminal device 6. The provided services include a content download service.

The server device 10 includes a content server that transmits a digital content such as game software, moving images, music, cartoons, or novels to a terminal device installed in a home of the user A. The terminal device installed in the home may be a game device. The user A can purchase a content sold by the content server after signing in to the server device 10 from the portable terminal device 6. When the portable terminal device 6 accesses the content server, a content selecting screen is displayed on a display. The user A selects and purchases a content to be enjoyed on the game device at the home. The information processing system 1 thus provides a "remote download function" of downloading the content to the game device of the home by using the portable terminal device 6 while the user A is present at another place than the home.

The home of the user A is provided with an access point (hereinafter referred to as an "AP") 5 for connection to the network 3. However, in a state depicted in FIG. 1, the game device is not connected to the AP 5. Here, a situation is assumed in which the user A has purchased a new game device, and the game device has not yet arrived at the home. For example, a situation is assumed in which a new model of game device that started to be sold is reserved on the Internet, and the arrival thereof takes some time. The information processing system 1 according to the embodiment provides a mechanism in which the user A can purchase a content on the content server and reserve the content to be obtained even when the game device has not arrived at the home, and a time taken to start game play can be shortened when the game device arrives at the home.

Figure 2:
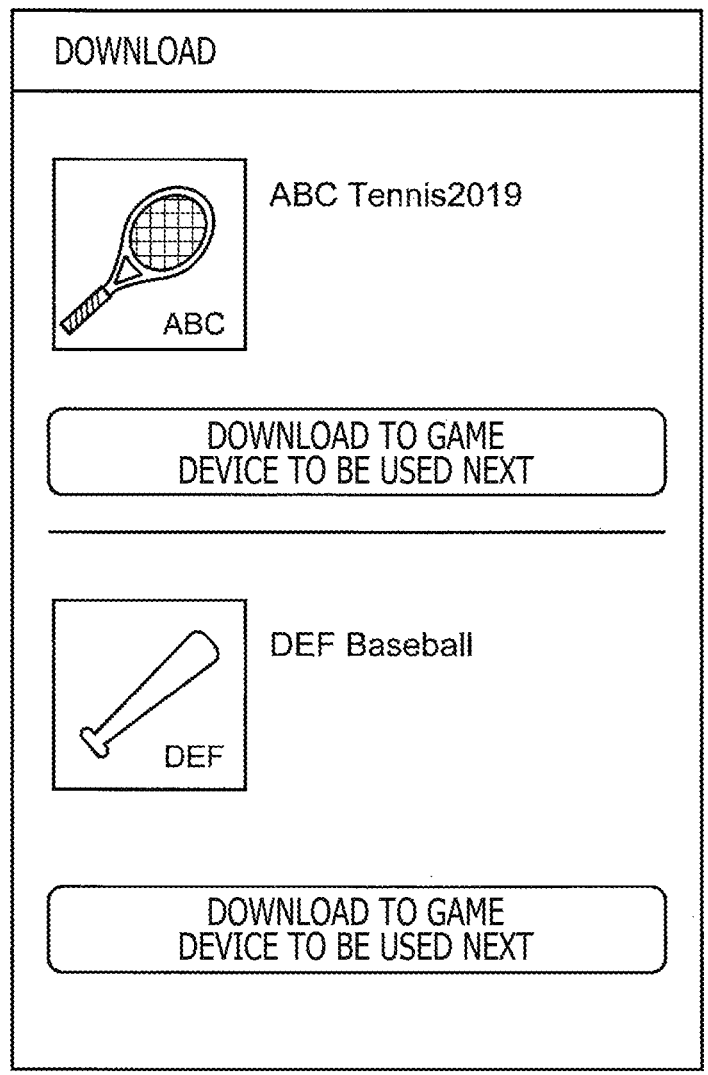
FIG. 2 is a diagram depicting an obtainment reservation screen for performing content obtainment reservation.

FIG. 2 depicts an obtainment reservation screen for performing content obtainment reservation. The display of the portable terminal device 6 displays an obtainment reservation button for selecting "DOWNLOAD TO GAME DEVICE TO BE USED NEXT" with regard to a content corresponding to the new model of game device. When the user A taps the obtainment reservation button of "ABC Tennis 2019," the portable terminal device 6 transmits an obtainment request for "ABC Tennis 2019" to the server device 10 together with an account of the user A. This obtainment request does not immediately request the downloading of the content, but is a reservation request requesting the download when a predetermined condition is satisfied.

Figures 3, 4:
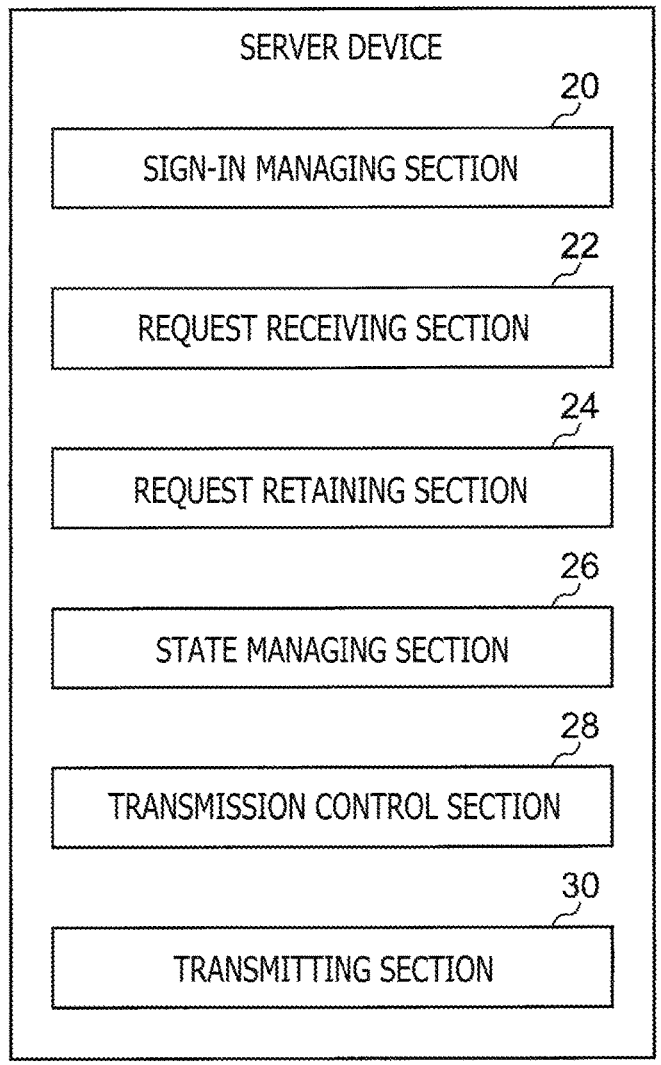
FIG. 3 is a diagram depicting functional blocks of a server device.
FIG. 4 is a diagram depicting a state related to download in an obtainment request.

FIG. 3 depicts functional blocks of the server device 10. The server device 10 includes a sign-in managing section 20, a request receiving section 22, a request retaining section 24, a state managing section 26, a transmission control section 28, and a transmitting section 30.

The sign-in managing section 20 registers a sign-in identification (ID) and a password of a user and an apparatus ID of a terminal device used by the user in a user database (user DB) in association with an account of the user. Only one account is assigned to one user. The sign-in managing section 20 records a sign-in history of the user in a recording device, and manages a signed-in state of the user. The sign-in history includes a sign-in start date and time, a sign-in end date and time, and the apparatus ID of the terminal device used to sign in. The user can sign in to the server device 10 from a plurality of terminal devices at the same time by using the one account.

When the user A transmits a sign-in ID and a password from the portable terminal device 6 to the server device 10, the sign-in managing section 20 determines that the sign-in ID and the password match the sign-in ID and the password of the user A registered in the user DB, and permits the user A to sign in. After the user A signs in, the user A accesses the content server, and purchases a content to be played on the game device to be installed in the home.

The request receiving section 22 receives a request to obtain the content from the user A. In the embodiment, the request receiving section 22 receives a request to obtain "ABC Tennis 2019." This obtainment request is a reservation request requesting a download to the game device used by the user A when a predetermined condition is satisfied. The request retaining section 24 retains the request to obtain the content in association with the account of the user A. The state managing section 26 manages a state related to the download in the obtainment request.

FIG. 4 depicts a state related to the download in the obtainment request. The state managing section 26 manages the state of the request to obtain the content "ABC Tennis 2019" in association with the account of the user A. An item of "download device" is an item for setting the apparatus ID of the game device that downloads the content. However, at this point in time, the user A does not have the game device, and therefore this item is blank. "Before DL" indicates "before download."

Figure 5:
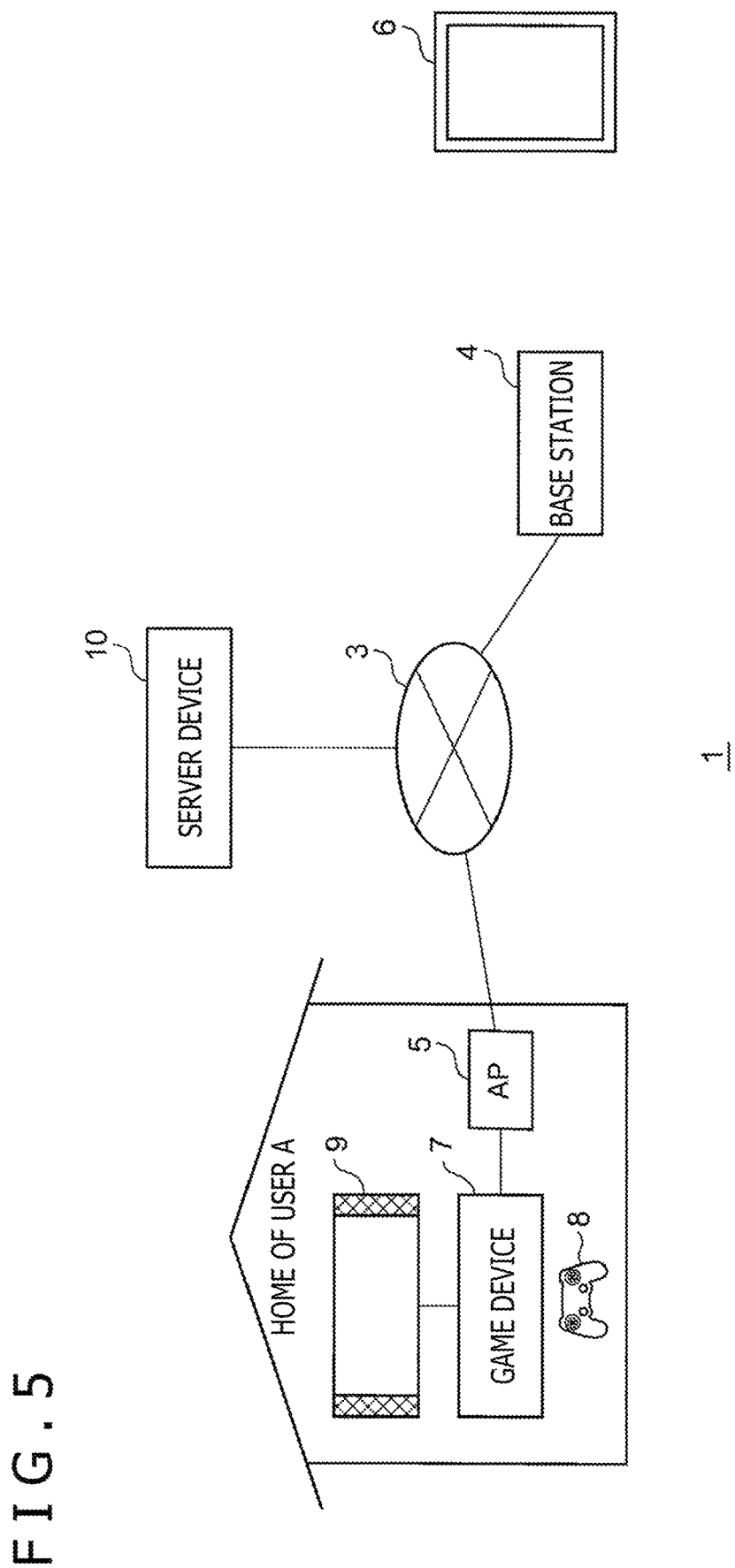
FIG. 5 is a diagram depicting a state in which a game device is connected to peripheral devices by cable.

FIG. 5 depicts a state in which the game device 7 has arrived at the home of the user A, and the user A has connected the game device 7 to the AP 5 and a television set 9 by cable. After the user A connects the game device 7 to a peripheral device, the user A displays a setting screen on the television set 9, and makes initial settings including selection of a language to be used, setting of Internet connection, setting of a date and time, and a power saving setting by using a game controller 8. When the user A signs in to the server device 10 by using the account after completion of the initial settings, the server device 10 confirms that a predetermined condition is satisfied, and transmits the content "ABC Tennis 2019." This download processing will be described in the following.

In order to sign in to the server device 10, the user A inputs the sign-in ID and the password to the game device 7, and makes the sign-in ID and the password transmitted from the game device 7 to the server device 10. The sign-in managing section 20 receives the sign-in ID and the password and the apparatus ID of the game device from the game device 7, refers to sign-in IDs and passwords registered in the user DB, and searches for a sign-in ID and a password that match. When the sign-in managing section 20 confirms that the received sign-in ID and the received password are the sign-in ID and the password associated with the account of the user A, the sign-in managing section 20 permits the user A to sign in by using the account of the user A.

At this time, the sign-in managing section 20 determines whether or not the signed-in user A satisfies a predetermined condition in relation to the game device 7. In a case where the signed-in user A satisfies the predetermined condition in relation to the game device 7, the transmission control section 28 instructs the transmitting section 30 to transmit the content requested to be obtained to the game device 7, and the transmitting section 30 transmits "ABC Tennis 2019" to the game device 7.

Here, the predetermined condition is that the signed-in user A is a first user to sign in from the game device 7. That is, the condition is that a history of signing in by using the game device 7 has not been recorded thus far in the sign-in managing section 20, and that the game device 7 is registered in the user DB for the first time as a terminal device of the user A. In a case where this condition is satisfied, the transmission control section 28 determines that the content requested to be obtained by the user A is to be transmitted to the game device 7, and instructs the transmitting section 30 to transmit the content requested to be obtained by the user A. Thus, when the user A signs in to the server device 10 from the new game device 7, the game device 7 automatically downloads "ABC Tennis 2019" whose obtainment request is registered in advance. The download is started when the user A merely signs in to the server device 10. A time taken from the completion of the initial settings to a start of game play is therefore shortened.

FIG. 6 depicts a state related to the download in the obtainment request. In relation to the obtainment request of the user A, the state managing section 26 records the apparatus ID of the game device 7 as "download device," and records DL confirmed as "state." "DL confirmed" indicates a state in which completion of the download related to the obtainment request is confirmed, and the download related to the obtainment request does not occur again. Incidentally, as will be described later, "DL completed" indicates a state in which the download related to the obtainment request is completed, but there is a possibility that the download related to the obtainment request occurs again.

Figure 7:
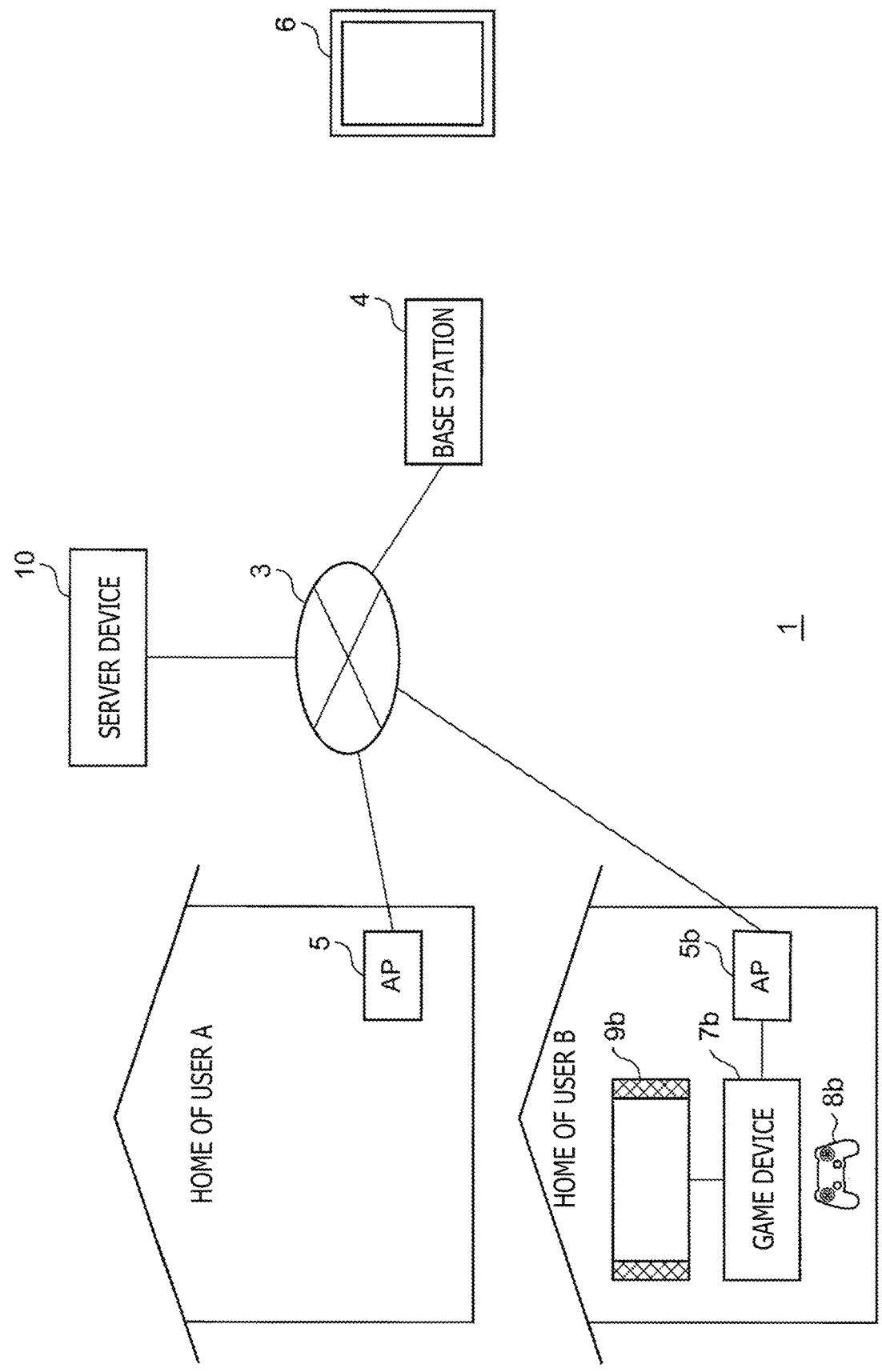
FIG. 7 is a diagram depicting a situation in which a user plays a game at a home of a friend.

FIG. 7 depicts a situation in which the user A plays a game at a home of a user B as a friend. At the home of the user B, a game device 7b is connected to an AP 5b and a television set 9b. In this case, suppose that the game device 7 has not yet arrived at the home of the user A, and that the download of "ABC Tennis 2019" whose obtainment reservation has been made is not performed. In addition, suppose that at this point in time, the user B has signed in to the server device 10 from the game device 7b once or more.

The user A transmits the sign-in ID and the password from the game device 7b to the server device 10. After the sign-in managing section 20 refers to the user DB, and permits the user A to sign in, the sign-in managing section 20 determines whether or not the signed-in user A satisfies a predetermined condition in relation to the game device 7b. The predetermined condition is that the user A is a first user to sign in from the game device 7b. Here, the user A is not the first user to sign in from the game device 7b. The sign-in managing section 20 therefore determines that the condition is not satisfied. At this time, the transmission control section 28 displays a confirmation screen related to the download of the content on the game device 7b.

Figure 8:
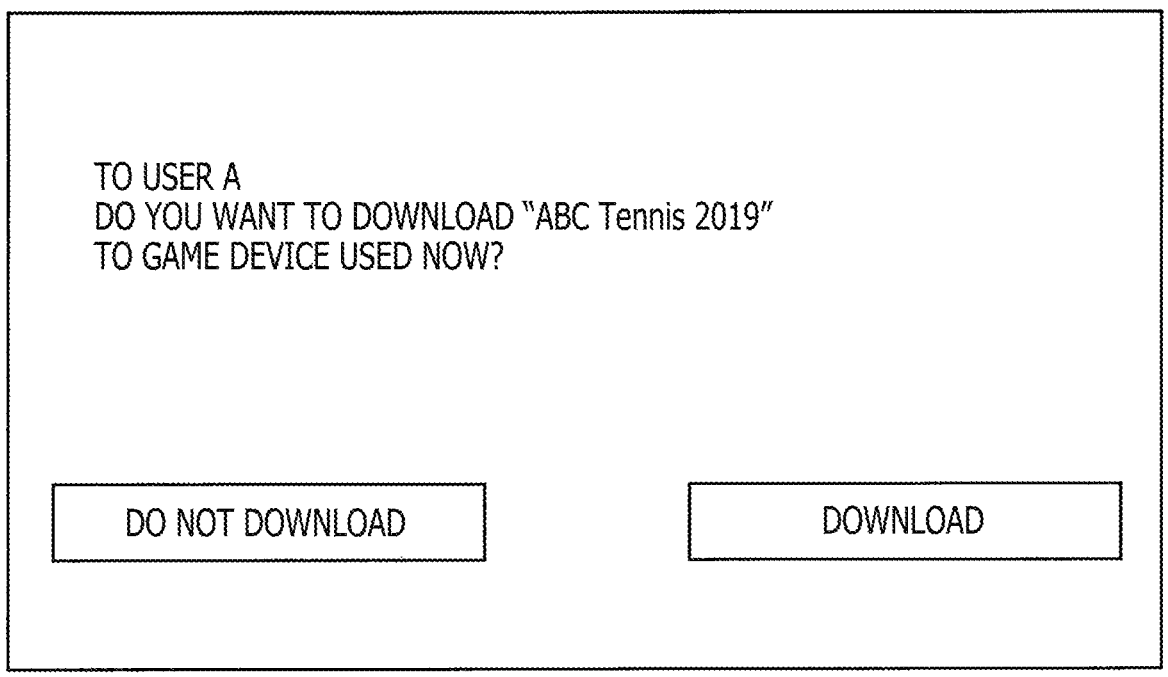
FIG. 8 is a diagram depicting a confirmation screen.

FIG. 8 depicts the confirmation screen displayed on the television set 9b. In a case where the user A does not desire the download, the user A selects "do not download" by operating a game controller 8b. Incidentally, in a case where the user A desires the download, the user A selects "download." In this case, the transmission control section 28 decides to transmit "ABC Tennis 2019" to the game device 7b, and instructs the transmitting section 30 to transmit "ABC Tennis 2019" to the game device 7b.

Incidentally, the request receiving section 22 may receive a request to obtain a content associated with the account of the user A from a user C different from the user A.

Figures 9, 10, 11:
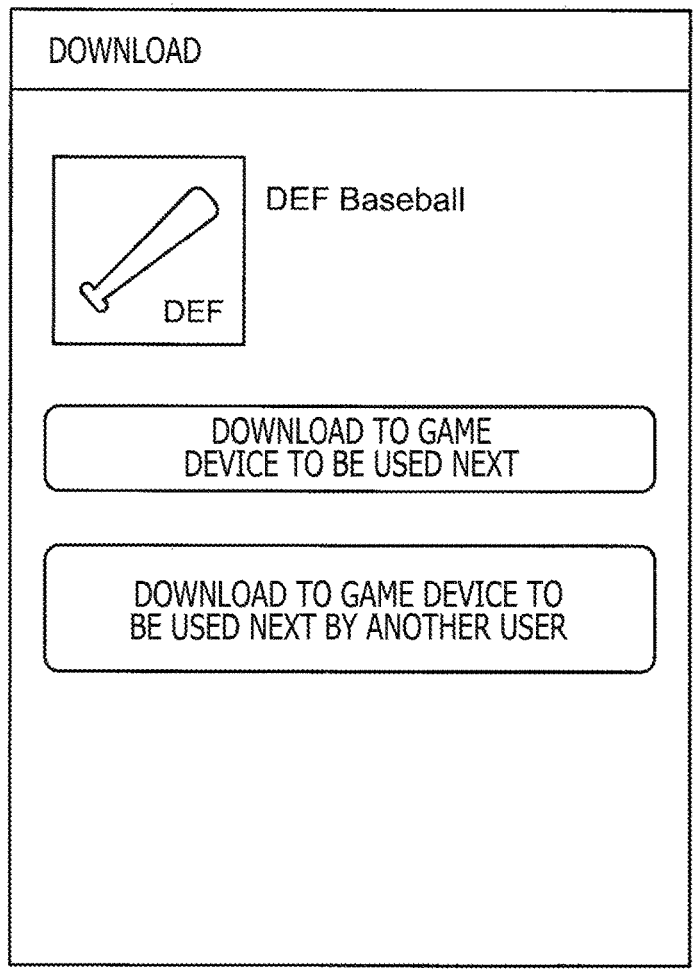
FIG. 9 is a diagram depicting another example of the obtainment reservation screen.
FIG. 10 is a diagram depicting a state related to download in an obtainment request.
FIG. 11 is a diagram depicting a state related to download in the obtainment request.

FIG. 9 depicts another example of the obtainment reservation screen displayed on a portable terminal device of the user C. This obtainment reservation screen is provided with an obtainment reservation button for selecting "DOWNLOAD TO GAME DEVICE TO BE USED NEXT" and an obtainment reservation button for selecting "DOWNLOAD TO GAME DEVICE TO BE USED NEXT BY ANOTHER USER." Here, when the user C taps the obtainment reservation button of "DOWNLOAD TO GAME DEVICE TO BE USED NEXT BY ANOTHER USER," a screen for specifying a user is further displayed. Here, when the user C specifies the user A, the request receiving section 22 receives a request to obtain a content associated with the account of the user A from the user C.

At this time, the request receiving section 22 notifies the user A that the request to obtain the content is received from the user C, and checks whether or not the user A consents. Here, when the user A consents to the obtainment request, the request retaining section 24 retains the content obtainment request of the user C in association with the account of the user A. In a case where the user C is a family member of the user A, for example, it is assumed that the user C requests the obtainment of the content in association with the account of the user A.

The above description has been made of a technology in which the transmitting section 30 automatically transmits a content to the game device 7 on condition that the user A sign in to the server device 10 from the game device 7 for the first time. The following description will be made of a case where the content is downloaded to the game device 7 before factory shipment, and the game device 7 to which the content is already downloaded is delivered to the home of the user A.

At a factory, the game device 7 is connected to the server device 10. In this case of download before shipment, the transmission control section 28 refers to the obtainment request of the user A which obtainment request is retained in the request retaining section 24, and instructs the transmitting section 30 to transmit the content "ABC Tennis 2019" to the game device 7 at the factory. Accordingly, the transmitting section 30 transmits "ABC Tennis 2019," and the game device 7 installs "ABC Tennis 2019."

FIG. 10 depicts a state related to the download in the obtainment request. The state managing section 26 manages the state of the request to obtain the content "ABC Tennis 2019" in association with the account of the user A. In relation to the obtainment request of the user A, the state managing section 26 records the apparatus ID of the game device 7 as "download device," and records DL completed as "state." "DL completed" indicates a state in which the download related to the obtainment request is completed, but whether the downloaded content is used effectively is not determined and there is a possibility that the download related to the obtainment request occurs again.

When the game device 7 to which the content is already downloaded arrives at the home of the user A, the user A connects the game device 7 to the AP 5 and the television set 9 by cable, and makes initial settings of the game device 7. After completion of the initial settings, in order to sign in to the server device 10, the user A inputs the sign-in ID and the password to the game device 7, and makes the sign-in ID and the password transmitted from the game device 7 to the server device 10. The sign-in managing section 20 receives the sign-in ID and the password and the apparatus ID of the game device from the game device 7, refers to sign-in IDs and passwords registered in the user DB, and searches for a sign-in ID and a password that match. When the sign-in managing section 20 confirms that the received sign-in ID and the received password are the sign-in ID and the password associated with the account of the user A, the sign-in managing section 20 permits the user A to sign in by using the account of the user A.

At this time, the sign-in managing section 20 determines whether or not the signed-in user A satisfies a predetermined condition in relation to the game device 7. The predetermined condition may be a condition that the signed-in user A is a first user to sign in from the game device 7. In a case where the signed-in user A satisfies the predetermined condition in relation to the game device 7, the state managing section 26 determines that processing related to the obtainment request is completed, and changes the state related to the download in the obtainment request.

FIG. 11 depicts a state related to the download in the obtainment request. In relation to the obtainment request of the user A, the state managing section 26 records DL confirmed as "state." "DL confirmed" indicates a state in which completion of the download related to the obtainment request is confirmed, and processing related to the obtainment request is completed. That is, when "DL confirmed" is set, the download related to the obtainment request does not occur again. In the case where the content is installed at the factory before shipment, the user A can execute the content immediately after the initial settings of the game device 7 at the home.

Incidentally, description will be made of a case where the game device 7 to which the content for the user A is already downloaded is misdelivered to another user D. The user D connects the game device 7 to peripheral devices, and makes initial settings of the game device 7. After completion of the initial settings, in order to sign in to the server device 10, the user D inputs a sign-in ID and a password of the user D to the game device 7, and makes the sign-in ID and the password transmitted from the game device 7 to the server device 10. The sign-in managing section 20 receives the sign-in ID and the password and the apparatus ID of the game device from the game device 7, refers to sign-in IDs and passwords registered in the user DB, and searches for a sign-in ID and a password that match. When the sign-in managing section 20 confirms that the received sign-in ID and the received password are the sign-in ID and the password associated with the account of the user D, the sign-in managing section 20 permits the user D to sign in by using the account of the user D.

At this time, the sign-in managing section 20 determines whether or not the signed-in user D satisfies a predetermined condition in relation to the game device 7. The predetermined condition is that the signed-in user is the user A and that the user A signs in from the game device 7 for the first time. However, the signed-in user D is not the user A. Accordingly, the state managing section 26 instructs the game device 7 to uninstall the content, or uninstall "ABC Tennis 2019" in this case. Receiving this uninstallation instruction, the game device 7 uninstalls the installed content. At this time, the state managing section 26 returns the state related to the download in the obtainment request to the state depicted in FIG. 4.

The present disclosure has been described above on the basis of the embodiment thereof. The present embodiment is illustrative, and it is to be understood by those skilled in the art that combinations of constituent elements and processing processes of the embodiment are susceptible of various modifications, and that such modifications also fall within the scope of the present disclosure.

In the embodiment, FIG. 2 depicts an obtainment reservation screen for performing content obtainment reservation. The obtainment reservation screen depicted in FIG. 2 displays an obtainment reservation button for selecting "DOWNLOAD TO GAME DEVICE TO BE USED NEXT" with regard to a content corresponding to a new model of game device.

Figure 12:
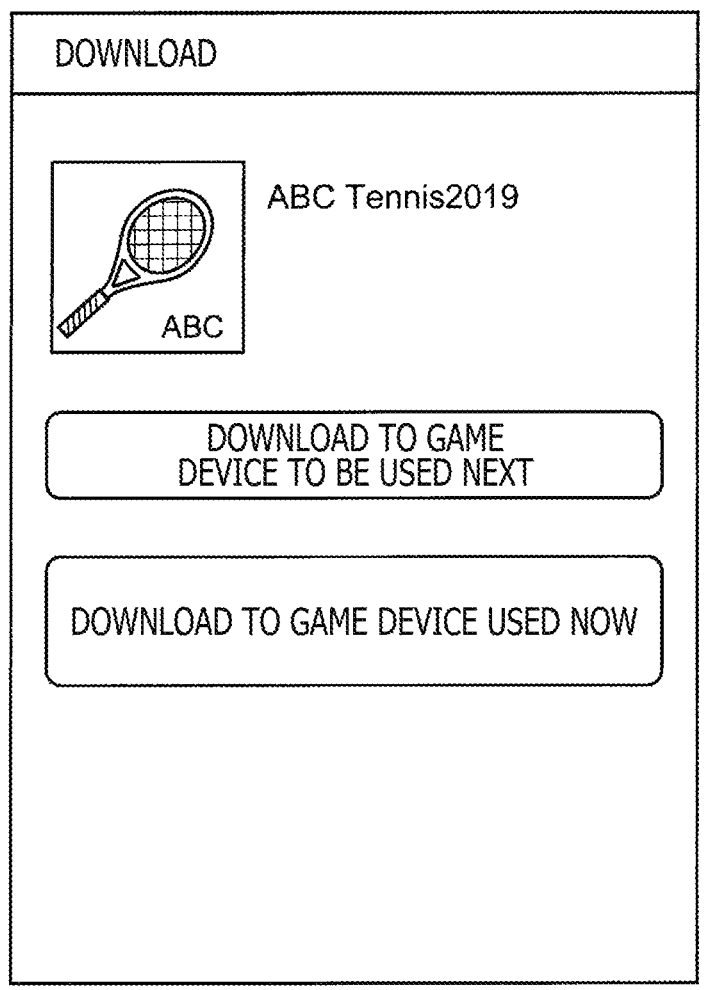
FIG. 12 is a diagram depicting an obtainment reservation screen for performing content obtainment reservation.

FIG. 12 depicts another example of the obtainment reservation screen for performing content obtainment reservation. In a case where the user A already possesses a game device that can download and execute "ABC Tennis 2019" at the home, for example, the user A may have a plan to purchase a new game device, and desire to download "ABC Tennis 2019" to the game device to be purchased newly. Accordingly, the obtainment reservation screen may display an obtainment reservation button for selecting "DOWNLOAD TO GAME DEVICE TO BE USED NEXT" together with an obtainment button for selecting "DOWNLOAD TO GAME DEVICE USED NOW."

When the user A selects "DOWNLOAD TO GAME DEVICE TO BE USED NEXT," and as described in the embodiment, the user A connects the new game device 7 that has arrived at the home to peripheral devices, makes initial settings, and signs in, the sign-in managing section 20 determines that the signed-in user A satisfies the predetermined condition in relation to the game device 7. At this time, the transmission control section 28 instructs the transmitting section 30 to transmit the content requested to be obtained to the game device 7, and the transmitting section 30 transmits "ABC Tennis 2019" to the game device 7.

Even when the user A signs in from the game device already possessed at the home before the new game device 7 arrives at the home, the sign-in managing section 20 determines that this sign-in is not a first sign-in because a past sign-in history of the game device in question is recorded. The sign-in managing section 20 therefore determines that the sign-in of the user A to the already possessed game device does not satisfy the predetermined condition in relation to the game device 7. Hence, the transmission control section 28 does not instruct the transmitting section 30 to transmit the content to the game device in question. Incidentally, when the user A selects "DOWNLOAD TO GAME DEVICE USED NOW" on the obtainment reservation screen depicted in FIG. 12, the content is remotely downloaded to the game device used now by a remote download function.

What is claimed is:

1. A server device comprising:
   a request receiving section configured to receive a request to obtain a content from a user;
   a request retaining section configured to retain the request to obtain the content in association with an account of the user;
   a sign-in managing section configured to permit the user to sign in from a terminal device by using the account of the user; and
   a transmission control section configured to give an instruction to transmit the content requested to be obtained to the terminal device;
   the transmission control section deciding to transmit the content to the terminal device in a case where the signed-in user satisfies a predetermined condition in relation to the terminal device,
   wherein the transmission control section decides to transmit the content to the terminal device in a case where the signed-in user is a first user to sign in from the terminal device and the account of the user is associated with the content, and wherein the transmission control section does not transmit the content to the terminal device in a case where the signed-in user is not the first user to sign in from the terminal device even if the account of the user is associated with the content.

2. The server device according to claim 1, wherein the transmission control section displays a confirmation screen related to download of the content on the terminal device in a case where the signed-in user does not satisfy the predetermined condition in relation to the terminal device.

3. The server device according to claim 1, wherein when the request receiving section receives the request to obtain the content associated with an account of a second user from a first user, the request retaining section retains the request to obtain the content on condition that the second user consent to the obtainment request, wherein the content is unavailable to the first user until the second user revokes the sharing.

4. A server device comprising:

a request receiving section configured to receive a request to obtain a content from a user;

a request retaining section configured to retain the request to obtain the content in association with an account of the user;

a sign-in managing section configured to permit the user to sign in from a terminal device in which the content requested to be obtained is installed by using the account; and a state managing section configured to determine that processing for the obtainment request is completed in a case where the signed-in user satisfies a predetermined condition in relation to the terminal device, wherein the content is transmitted to the terminal device in a case where the signed-in user is a first user to sign in from the terminal device and the account of the user is associated with the content, and wherein the content is not transmitted to the terminal device in a case where the signed-in user is not the first user to sign in from the terminal device even if the account of the user is associated with the content.

5. The server device according to claim 4, wherein the state managing section instructs the terminal device to uninstall the content in a case where the signed-in user does not satisfy the predetermined condition in relation to the terminal device.

6. A content transmitting method comprising:

receiving a request to obtain a content from a user;

retaining the request to obtain the content in association with an account of the user;

permitting the user to sign in from a terminal device by using the account of the user; and giving an instruction to transmit the content requested to be obtained to the terminal device in a case where the signed-in user satisfies a predetermined condition in relation to the terminal device, wherein the content is transmitted to the terminal device in a case where the signed-in user is a first user to sign in from the terminal device and the account of the user is associated with the content, and wherein the content is not transmitted to the terminal device in a case where the signed-in user is not the first user to sign in from the terminal device even if the account of the user is associated with the content.

7. A download managing method comprising:

receiving a request to obtain a content from a user;

retaining the request to obtain the content in association with an account of the user;

permitting the user to sign in from a terminal device in which the content requested to be obtained is installed by using the account; and determining that processing for the obtainment request is completed in a case where the signed-in user satisfies a predetermined condition in relation to the terminal device, wherein the content is transmitted to the terminal device in a case where the signed-in user is a first user to sign in from the terminal device and the account of the user is associated with the content, and wherein the content is not transmitted to the terminal device in a case where the signed-in user is not the first user to sign in from the terminal device even if the account of the user is associated with the content.

* * * * *